United States Patent
Jee et al.

(10) Patent No.: US 10,574,674 B2
(45) Date of Patent: Feb. 25, 2020

(54) HOST LEVEL DETECT MECHANISM FOR MALICIOUS DNS ACTIVITIES

(71) Applicants: NEC Laboratories America, Inc., Princeton, NJ (US); NEC Corporation, Tokyo (JP)

(72) Inventors: Kangkook Jee, Princeton, NJ (US); Zhichun Li, Princeton, NJ (US); Guofei Jiang, Princeton, NJ (US); Lauri Korts-Parn, Tokyo (JP); Zhenyu Wu, Plainsboro, NJ (US); Yixin Sun, Princeton, NJ (US); Junghwan Rhee, Princeton, NJ (US)

(73) Assignee: NEC Corporation (JP)

(*) Notice: Subject to any disclaimer, the term of this patent is extended or adjusted under 35 U.S.C. 154(b) by 221 days.

(21) Appl. No.: 15/644,018

(22) Filed: Jul. 7, 2017

(65) Prior Publication Data
US 2018/0013775 A1    Jan. 11, 2018

Related U.S. Application Data

(60) Provisional application No. 62/359,823, filed on Jul. 8, 2016.

(51) Int. Cl.
*H04L 29/06* (2006.01)
*H04L 29/12* (2006.01)

(52) U.S. Cl.
CPC ...... *H04L 63/1416* (2013.01); *H04L 61/1511* (2013.01); *H04L 61/2007* (2013.01); *H04L 63/1425* (2013.01)

(58) Field of Classification Search
CPC ............ H04L 63/1416; H04L 63/1425; H04L 61/2007; H04L 61/1511
See application file for complete search history.

(56) References Cited

U.S. PATENT DOCUMENTS

| | | | | |
|---|---|---|---|---|
| 6,161,008 A * | 12/2000 | Lee | ................... | H04M 3/42229 370/352 |
| 6,751,459 B1 * | 6/2004 | Lee | ......................... | H04W 8/18 455/432.1 |
| 9,479,572 B1 * | 10/2016 | Subramanian | ........ | H04L 41/046 |

(Continued)

OTHER PUBLICATIONS

Antonakakis, et al., "Detecting Malware Domains at the Upper DNS Hierarchy", Georgia Institute of Technology, School of Computer Science, Proceedings of the 20th USENIX conference on Security, Aug. 2011, pp. 1-16.

(Continued)

*Primary Examiner* — J. Brant Murphy
(74) *Attorney, Agent, or Firm* — Joseph Kolodka

(57) ABSTRACT

A system and computer-implemented method are provided for host level detection of malicious Domain Name System (DNS) activities in a network environment having multiple end-hosts. The system includes a set of DNS resolver agents configured to (i) gather DNS activities from each of the multiple end-hosts by recording DNS queries and DNS responses corresponding to the DNS queries, and (ii) associate the DNS activities with Program Identifiers (PIDs) that identify programs that issued the DNS queries. The system further includes a backend server configured to detect one or more of the malicious DNS activities based on the gathered DNS activities and the PIDs.

14 Claims, 11 Drawing Sheets

(56) References Cited

U.S. PATENT DOCUMENTS

| | | | |
|---|---|---|---|
| 9,917,852 B1* | 3/2018 | Xu | H04L 63/1416 |
| 2005/0114694 A1* | 5/2005 | Wager | H04L 9/3271 |
| | | | 726/26 |
| 2007/0094411 A1* | 4/2007 | Mullane | H04L 29/12066 |
| | | | 709/245 |
| 2008/0016233 A1* | 1/2008 | Schneider | H04L 29/12066 |
| | | | 709/230 |
| 2008/0183853 A1* | 7/2008 | Manion | H04L 12/4641 |
| | | | 709/223 |
| 2008/0235383 A1* | 9/2008 | Schneider | H04L 29/12594 |
| | | | 709/229 |
| 2009/0327517 A1* | 12/2009 | Sivasubramanian | |
| | | | H04L 29/12132 |
| | | | 709/238 |
| 2010/0036959 A1* | 2/2010 | Trace | H04L 29/12066 |
| | | | 709/228 |
| 2010/0269174 A1* | 10/2010 | Shelest | H04L 29/12066 |
| | | | 726/22 |
| 2012/0246290 A1* | 9/2012 | Kagan | H04L 12/1485 |
| | | | 709/223 |
| 2013/0036307 A1* | 2/2013 | Gagliano | H04L 9/321 |
| | | | 713/171 |
| 2013/0097329 A1* | 4/2013 | Alex | H04L 61/1511 |
| | | | 709/228 |
| 2013/0254269 A1* | 9/2013 | Sivasubramanian | |
| | | | H04L 29/12132 |
| | | | 709/203 |
| 2013/0318170 A1* | 11/2013 | Crume | H04L 63/1408 |
| | | | 709/206 |
| 2014/0282887 A1* | 9/2014 | Kaminsky | H04L 61/1511 |
| | | | 726/4 |
| 2015/0074807 A1* | 3/2015 | Turbin | H04L 63/1416 |
| | | | 726/23 |
| 2015/0095499 A1* | 4/2015 | Noldus | H04L 61/1511 |
| | | | 709/226 |
| 2016/0134639 A1* | 5/2016 | Kaminsky | H04L 63/126 |
| | | | 726/7 |
| 2016/0164825 A1* | 6/2016 | Riedel | H04L 61/1511 |
| | | | 709/223 |
| 2017/0195342 A1* | 7/2017 | Sternfeld | H04L 63/145 |
| 2017/0245170 A1* | 8/2017 | Henry | H04W 28/0268 |
| 2017/0250952 A1* | 8/2017 | Westberg | H04L 63/0245 |
| 2017/0374086 A1* | 12/2017 | Jeong | H04L 63/1416 |
| 2019/0036981 A1* | 1/2019 | Thippesh | H04L 29/06 |

OTHER PUBLICATIONS

Bilge, et al., "Exposure: Finding Malicious Domains Using Passive DNS Analysis", Proceedings of the Network and Distributed System Security Symposium, Jan. 2011, 17 pages.

Chen, et al., "MitM Attack by Name Collision: Cause Analysis and Vulnerability Assessment in the New gTLD Era", IEEE, pp. 675-690.

* cited by examiner

HOST LEVEL DETECT MECHANISM FOR MALICIOUS DNS ACTIVITIES

RELATED APPLICATION INFORMATION

This application claims priority to provisional application Ser. No. 62/359,823 filed on Jul. 8, 2016, incorporated herein by reference.

BACKGROUND

Technical Field

The present invention relates to signal processing, and more particularly to host level detect mechanism for malicious Domain Name System (DNS) activities.

Description of the Related Art

Domain Name System (DNS) service is a foundation protocol that implements a distributed and hierarchical database used to map host names to IP (network layer) addresses, and vice-versa. DNS is the only service whose traffic bypasses the firewall and escapes controlled environments such as at-home Network Address Translation (NAT) devices, airport WIFI, and enterprise intranet.

Mainly for this reasons, attackers have long been interested in exploiting DNS service and use it as their attack vectors to reach out to an end-user's system. Worse still, lacking in security considerations from the initial design proposal, DNS protocol has provided attackers many ways to take advantage. Well-known attack classes include, for example, DNS hijacking attack, Command and Control (C2) communication over DNS, and DNS cache poisoning attack.

Hence, there is a need for a host level detect mechanism for malicious DNS activities.

SUMMARY

These and other drawbacks and disadvantages of the prior art are addressed by the present principles, which are directed to host level detect mechanism for malicious Domain Name System (DNS) activities.

According to an aspect of the present invention, a system is provided for host level detection of malicious Domain Name System (DNS) activities in a network environment having multiple end-hosts. The system includes a set of DNS resolver agents configured to (i) gather DNS activities from each of the multiple end-hosts by recording DNS queries and DNS responses corresponding to the DNS queries, and (ii) associate the DNS activities with Program Identifiers (PIDs) that identify programs that issued the DNS queries. The system further includes a backend server configured to detect one or more of the malicious DNS activities based on the gathered DNS activities and the PIDs.

According to another aspect of the present invention, a computer-implemented method is provided for host level detection of malicious Domain Name System (DNS) activities in a network environment having multiple end-hosts. The method includes gathering, by a set of DNS resolver agents, DNS activities from each of the multiple end-hosts by recording DNS queries and DNS responses corresponding to the DNS queries. The method further includes associating, by the set of DNS resolver agents, the DNS activities with Program Identifiers (PIDs) that identify programs that issued the DNS queries. The method also includes detecting, by a backend server, one or more of the malicious DNS activities based on the gathered DNS activities and the PIDs.

According to yet another aspect of the present invention, a computer program product is provided for host level detection of malicious Domain Name System (DNS) activities in a network environment having multiple end-hosts. The computer program product includes a non-transitory computer readable storage medium having program instructions embodied therewith. The program instructions are executable by a computer to cause the computer to perform a method. The method includes gathering, by a set of DNS resolver agents, DNS activities from each of the multiple end-hosts by recording DNS queries and DNS responses corresponding to the DNS queries. The method further includes associating, by the set of DNS resolver agents, the DNS activities with Program Identifiers (PIDs) that identify programs that issued the DNS queries. The method also includes detecting, by a backend server, one or more of the malicious DNS activities based on the gathered DNS activities and the PIDs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to host level detect mechanism for malicious Domain Name System (DNS) activities.

In an embodiment, the present invention implements a DNS resolver agent that runs a host-level passive DNS program which records DNS queries along with the responses. The resolver agent can be configured to associate the query/response records with the responsible program identifiers (PID). The resolver agent then reports captured DNS activities to the backend servers along with associated PID.

To support heterogeneous environments that include hosts with different Operating Systems (OS), in an embodiment, the present invention can implement the functionality in two ways.

Regarding the first way, an Operating System (OS) kernel driver is used that embeds a program identifier into a communication packet buffer and captures packets for a DNS query and its response. The resolver agent for a LINUX system can employ this model.

Regarding the second way, the agent collects activity logs from the OS's DNS broker program that consolidates and processes the host wide DNS activities. The log provides information regarding DNS queries along with its corresponding answers as well as program identifiers who issued the query. The resolver agent for a WINDOWS system and Mac OSX system can employ this model.

The resolver agents are deployed to the end-user's system and report all gathered DNS activities to the backend server which facilitates machine learning based detection.

Figure 1:
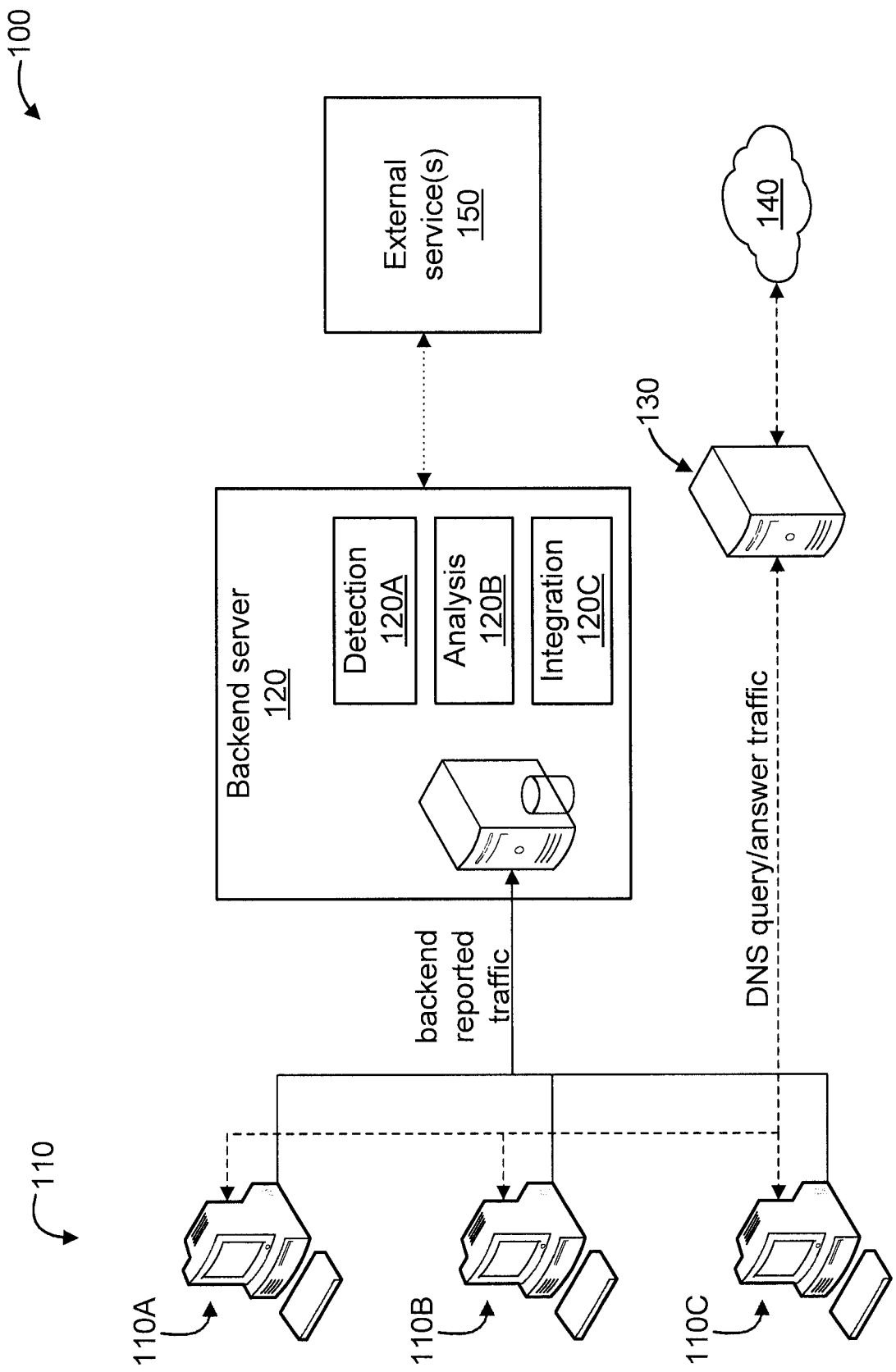
FIG. 1 shows an exemplary detection system for malicious DNS activities, in accordance with an embodiment of the present invention.

FIG. 1 shows an exemplary detection system 100 for malicious DNS activities, in accordance with an embodiment of the present invention. The detection system 100 is deployed in an environment 190. For the sake of illustration, the present invention is shown and described with respect to an enterprise environment in which intra-net connections and access to the outside Internet are strictly controlled and restricted. However, it is to be appreciated that the present invention can be used in any computer processing environment that uses DNS.

The detection system 100 involves the use of three different types of information flows as follows: (1) network traffic (e.g., DNS query/answer traffic) for DNS activities (shown using dashed lines); (2) connections (of the present invention) to report DNS activities gathered from each end-host (shown using solid lines); and (3) integration (of the present invention) with external components (shown using dotted block arrows).

A set of DNS Resolver agents 110 is deployed to end-hosts with different Operating Systems (LINUX 110A, Mac OSX 110B, and WINDOWS 110C). The DNS Resolver agents 110 capture DNS activities and report the DNS activities to the present invention's backend server 120 with DataBase (DB) storage that stores the activities for later operations. It is to be appreciated that the DNS queries first reach a Local DNS resolver, located inside the intra-net. When the resolver fails to resolve the queries, it then directs the queries to one or more DNS servers 130 which are located in the outside Internet, allowing the DNS traffic to escape from the intra-net.

With the DNS activities collected across the multiple end-hosts, the backend server 120 performs three different kinds of operations as follows: (1) detection 120A of abnormal or malicious DNS queries and answers; (2) advanced analysis 120B that builds up a model for sophisticated attack analysis and better root cause identification, and (3) integration 120C with one or more external services (e.g., a DNS blacklist service, another malicious DNS activity detection system, etc.).

The one or more DNS servers 130 are connected to a DNS hierarchy 140. The backend server 120 can interface with a DNS blacklist service 150.

Figure 2:
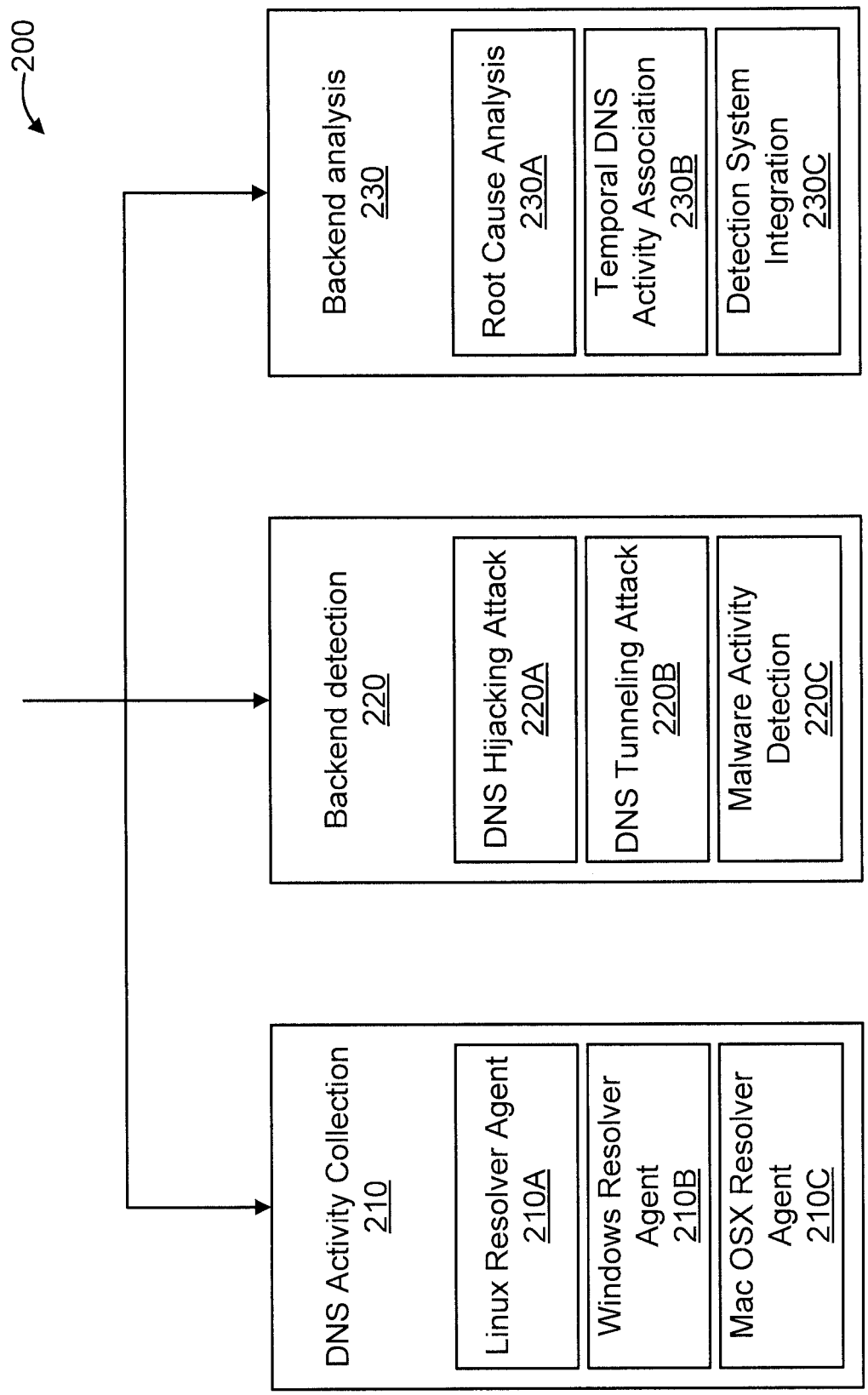
FIG. 2 shows an exemplary hierarchical data dependency arrangement relating to the detection system of FIG. 1, in accordance with an embodiment of the present invention.

FIG. 2 shows an exemplary hierarchical data dependency arrangement 200 relating to the detection system 100 of FIG. 1, in accordance with an embodiment of the present invention. The hierarchical data dependency arrangement 200 includes a DNS activity collection portion 210, a backend detection portion 220, and a backend analysis portion 230.

The DNS activity collection portion 210 includes a LINUX Resolver Agent 210A, a WINDOWS Resolver Agent 210B, and a Mac OSC Resolver Agent 210C.

The backend detection portion 220 includes a DNS hijacking attack detection portion 220A, a DNS tunneling attack detection portion 220B, and a malware activity detection portion 220C.

The backend analysis portion 230 includes a root cause analysis portion 230A, a temporal DNS activity association portion 230B, and a detection system integration portion 230C.

The present invention provides a bottom-up approach that deploys DNS resolver agents to end-hosts. The resolver agent collects DNS activities associated with the PID from each host, thus being capable of providing fine-grained DNS data collection.

Accordingly, the present invention can provide detection of attack activities that are not reported to DNS servers. Moreover, the present invention can provide additional information to facilitate machine learning based detection. Also, the present invention can provide improved reporting on detection. Additionally, the present invention can provide improved attack detection coverage. Further, the present invention can integrate with other detection mechanisms.

Figure 3:
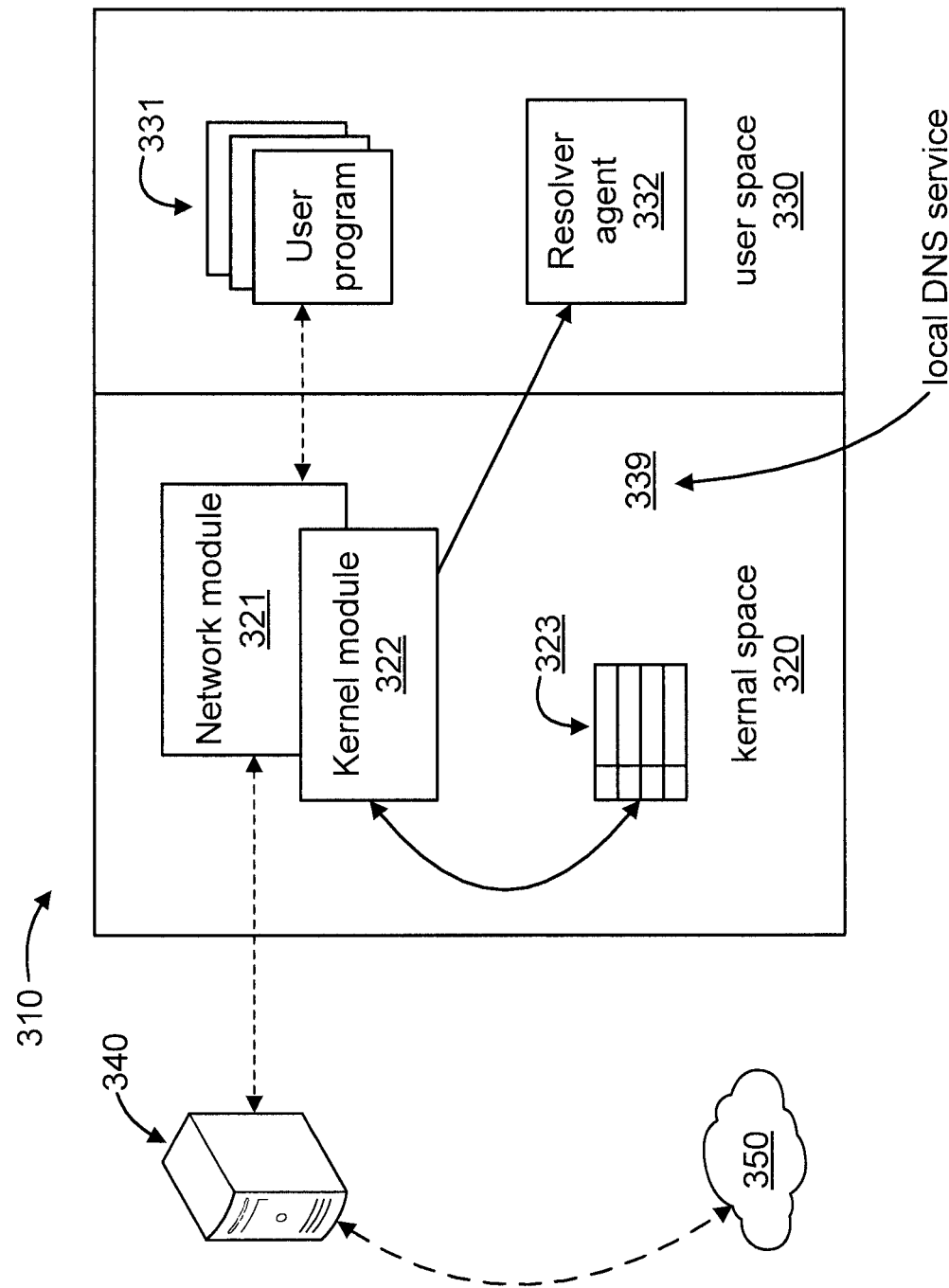
FIG. 3 shows an exemplary architecture of a DNS Resolver Agent for a LINUX system, in accordance with an embodiment of the present invention.

FIG. 3 shows an exemplary architecture 300 of a DNS Resolver Agent 332 for a LINUX system 310, in accordance with an embodiment of the present invention.

The architecture 300 includes the Linux system 310. The Linux system 310 has a kernel space 320 and a user space 330. The kernel space 320 includes a network module 321, a kernel module 322, and a process table 323. The kernel space 320 implements a local DNS service 339. The user space 330 includes a set of user programs 331 and the DNS Resolver Agent 332. External to the LINUX system 310 are a local DNS service 340 and a DNS hierarchy 350.

In a LINUX system, each application directly initiates DNS queries using User Datagram Protocol (UDP) connections. For the DNS Resolver Agent 332 to identify the PID associated to each DNS activity, the kernel module 322 is used. The kernel module 322 labels system wide network activities with the associated PID (by referring to a process table data structure) and delivering the labels to the user space. The DNS Resolver Agent 332, subscribing to the events from user space, maps DNS queries and its corresponding answers and then reports to the backend server.

In an embodiment, the kernel module 322 can correspond to the HONE open source project. Of course, other kernel modules can also be used in accordance with the teachings of the present invention, while maintaining the spirit of the present invention.

Figure 4:
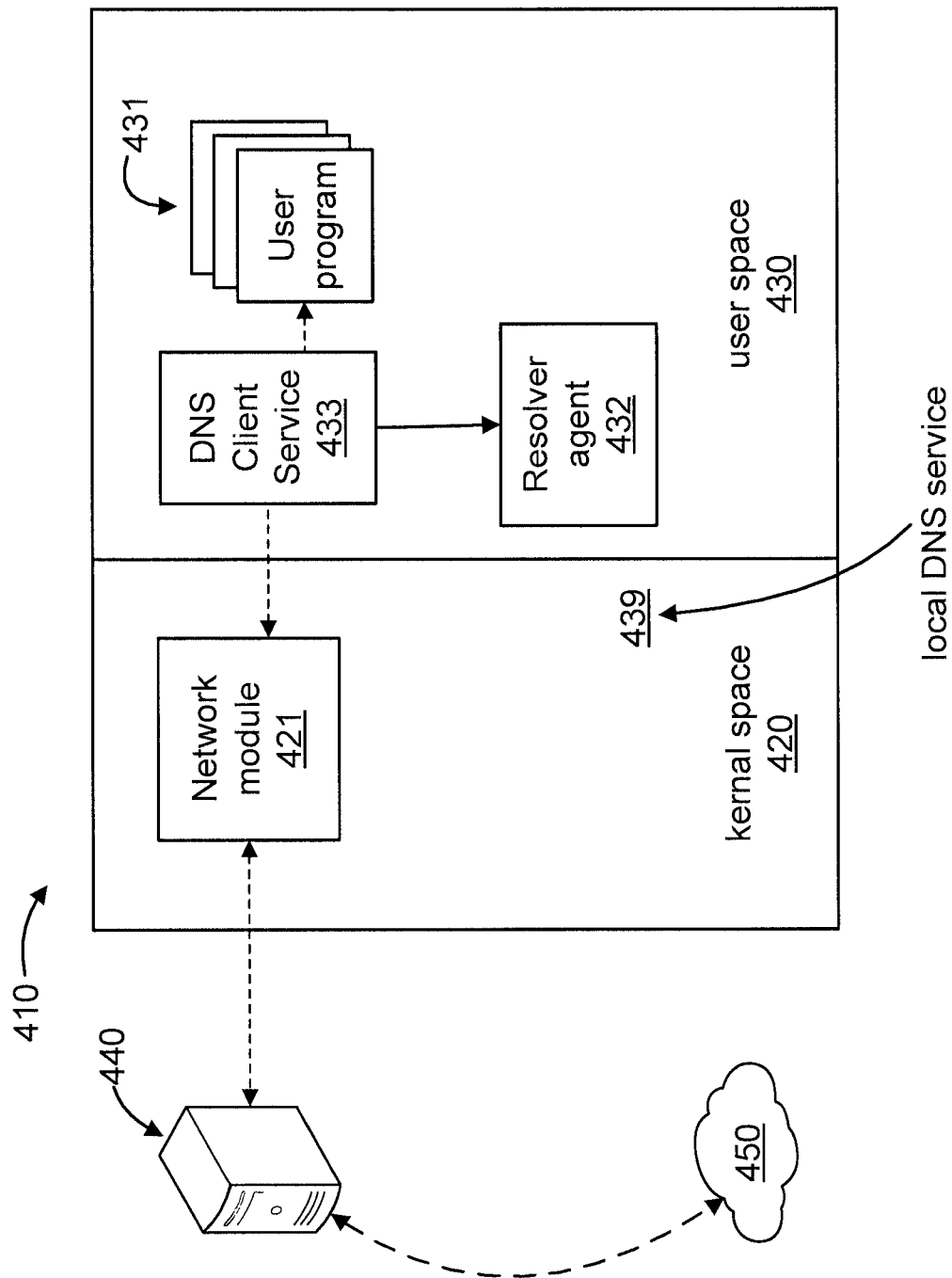
FIG. 4 shows an exemplary architecture of a DNS Resolver Agent for a WINDOWS system, in accordance with an embodiment of the present invention.

FIG. 4 shows an exemplary architecture 400 of a DNS Resolver Agent 432 for a WINDOWS system 410, in accordance with an embodiment of the present invention.

The architecture 400 includes the WINDOWS system 410. The WINDOWS system 410 has a kernel space 420 and a user space 430. The kernel space 420 includes a network module 421. The kernel space 420 implements a local DNS service 439. The user space 430 includes a set of user programs 431, the DNS Resolver Agent 432, and a DNS Client Service 433. External to the WINDOWS system 410 are a local DNS service 440 and a DNS hierarchy 450.

WINDOWS dedicates the DNS Client service 433 to perform DNS operations on behalf of all programs 431 running in the system. To perform DNS operations, each program 431 makes an IPC call to the DNS Client Service 433. The DNS Client Service 433 keeps its records for all DNS operations and responsible PIDs. The DNS Resolver Agent 432 accesses this information via an ETW (Event Tracing for WINDOWS) channel.

Figure 5:
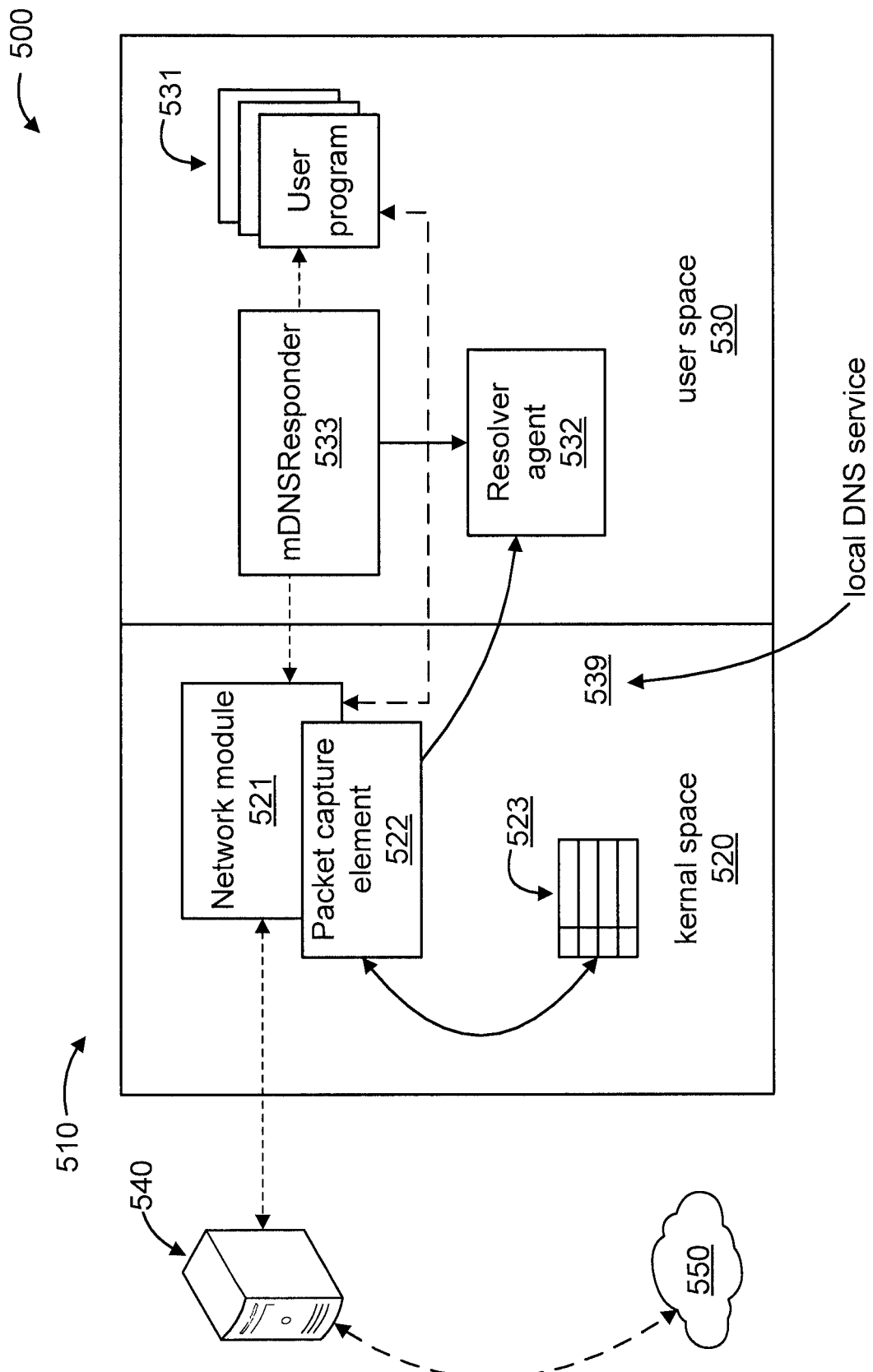
FIG. 5 shows an exemplary architecture of a DNS Resolver Agent for a Mac OSX system, in accordance with an embodiment of the present invention.

FIG. 5 shows an exemplary architecture 500 of a DNS Resolver Agent 532 for a Mac OSX system 510, in accordance with an embodiment of the present invention.

The architecture 500 includes the Mac OSX system 510. The Mac OSX system 510 has a kernel space 520 and a user space 530. The kernel space 520 includes a network module 521, a packet capture element 522, and a process table 523. The kernel space 520 implements a local DNS service 539. The user space 530 includes a set of user programs 531, the DNS Resolver Agent 532, and mDNSResponder (a zero configuration networking process) 533. External to the LINUX system 510 are a local DNS service 540 and a DNS hierarchy 550. While the embodiment of FIG. 5 involves the use of mDNSResponder, in other embodiments directed to a Mac OSX system, a different zero configuration networking process can be used, while maintaining the spirit of the present invention.

In Mac OSX, mDNSResponder plays a role of DNS broker program similar to Windows' DNS Client Service. While mDNSResponder performs DNS operation on behalf of the most user programs, Mac OSX also allows each application to issue DNS requests directly. For example, nslookup is a program that makes direct calls for its DNS operations. For completeness, the DNS Resolver Agent 532 for Mac OSX needs to cover both channels to associate all DNS activities with responsible PIDs. First, DNSResponder makes such information available from syslog channel. For DNS activities made by each application, the DNS Resolver Agent 532 resorts to the packet capture element 522. In an embodiment, the packet capture element 522 can be Mac OSX's built-in support for PCAPNG (Next Generation Packet Capturing Framework), which provides Packet-to-PID association.

It is to be appreciated that the present invention detects larger sets of DNS attacks than previously proposed solutions. Hereinafter, for the sake of illustrate, three indicative attack cases are described. However, it is to be appreciated that the present invention can be applied to many additional attack cases, as readily appreciated by one of ordinary skill in the art given the teachings of the present invention provided herein, while maintaining the spirit of the present invention.

Figure 6:
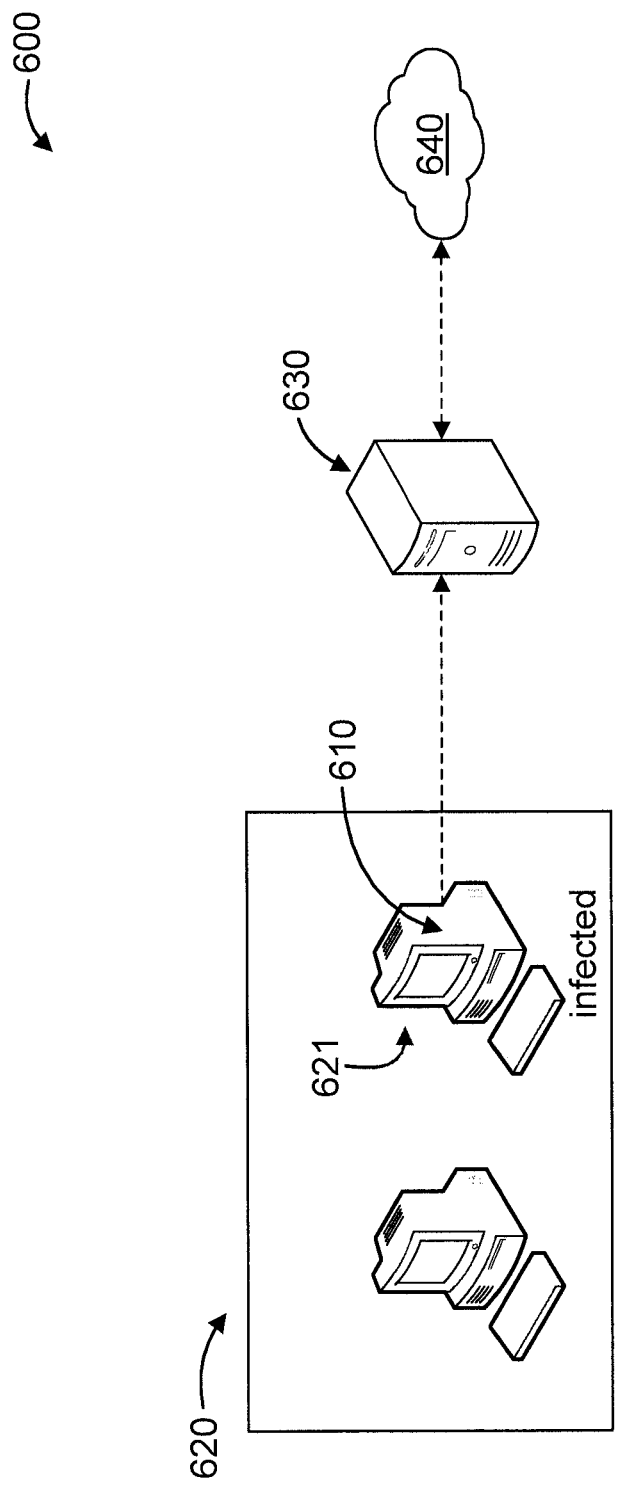
FIG. 6 shows an exemplary DNS attack, in accordance with an embodiment of the present invention.

FIG. 6 shows an exemplary DNS attack 600, in accordance with an embodiment of the present invention.

The DNS attack 600 involves a malware process 610, that has infected an end-host system 621, connected to a Command and Control (C2) host 630 (e.g., a local DNS server that, in turn, is connected to a DNS hierarchy 640).

Once the malware process 610 infects an end-host system 621 (e.g., from among a set of systems 620), malware commonly attempts to connect to the Command and Control (C2) host, that is, the centralized computer that issues commands to a botnet and reports back from infected computers. In efforts to establish such a connection in a stable way, the attackers employ a number of DNS techniques.

The attackers can simply hardcode a DNS name for a C2 host to malware binary, but a simple blacklisting scheme can counter it easily. The latest malwares have evolved to dynamically generate candidate domain names for a C2 host following a pre-determined logic.

The auto-generation of domain names will result in many failed DNS requests, while not all failed requests would reach any specific upper-level DNS server, so the previous approaches which only monitor traffic at specific DNS servers would fail to detect such attacks. The present invention can detect and report such attacks in the finest granularity.

Figure 7:
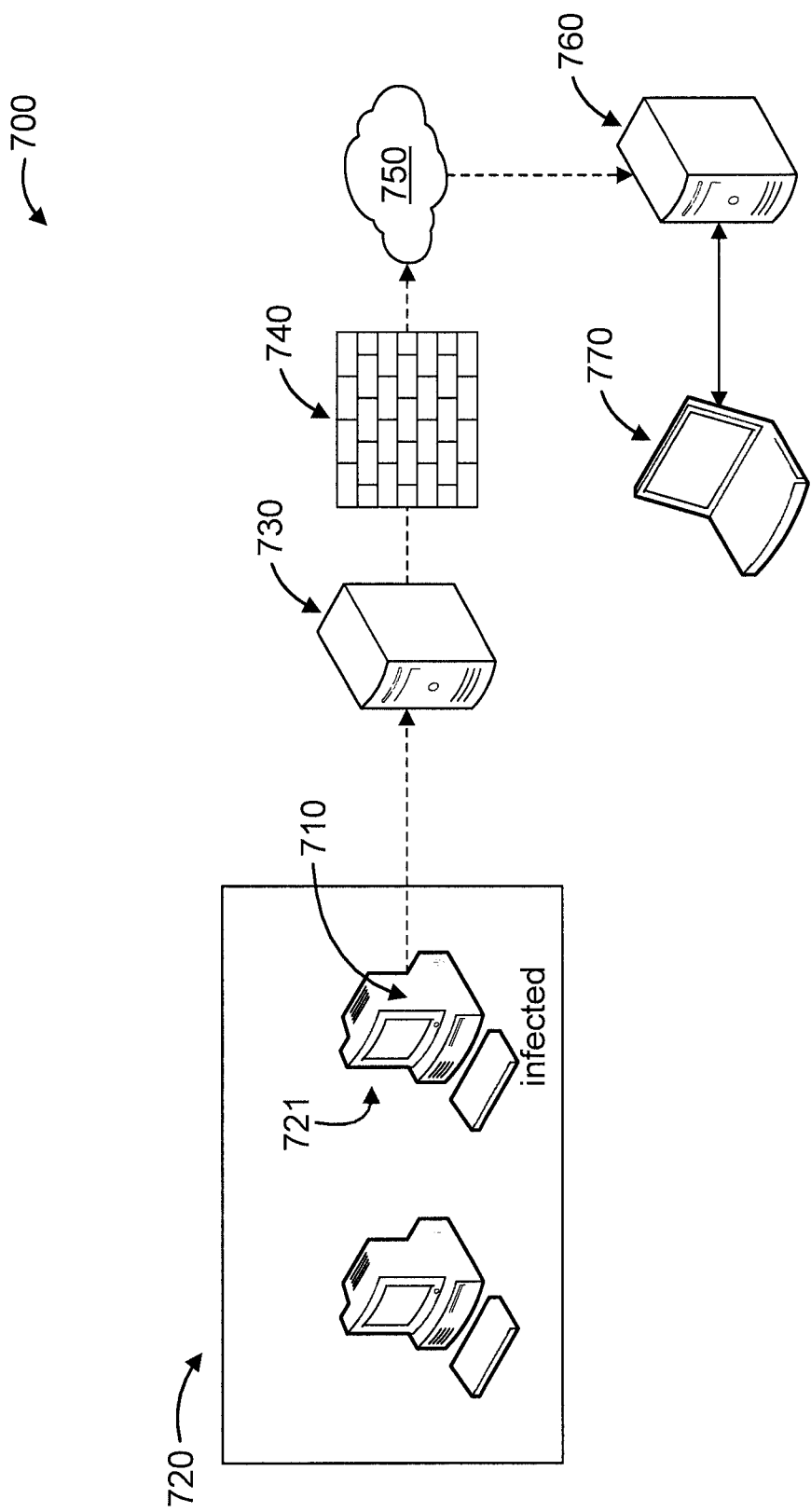
FIG. 7 shows another exemplary DNS attack, in accordance with an embodiment of the present invention.

FIG. 7 shows another exemplary DNS attack 700, in accordance with an embodiment of the present invention.

The DNS attack 700 involves a tunneling process 710 that embeds malware from an end-host system 721 (e.g., from among a set of systems 720), into DNS Query/Answer traffic sent to a local DNS server 730 and bypasses the firewall 740 going through the Internet 750 onto a malicious DNS server 760 and then to a malicious host 770.

DNS is often the only protocol that's not blocked by firewall rules in most environments, which can be taken advantage of by attackers who may use DNS service for a C2 connection for general data transfer.

Attackers embed payloads for such connections into DNS protocol's records for Query, Answer, or TXT fields which can include some arbitrary and unformatted text. The attackers carefully craft the size and contents of such payloads to evade detection mechanisms run by upper-layer DNS servers (e.g., servers 730 and 760). The DNS Resolver Agent, which is installed in end-hosts (e.g., end-hosts 720), will be able to locate the program that bursts such DNS activities in a short period time and thus detect such attacks. In contrast, previous approaches which only see aggregated DNS activities from all subordinate hosts cannot detect such behaviors.

Figure 8:
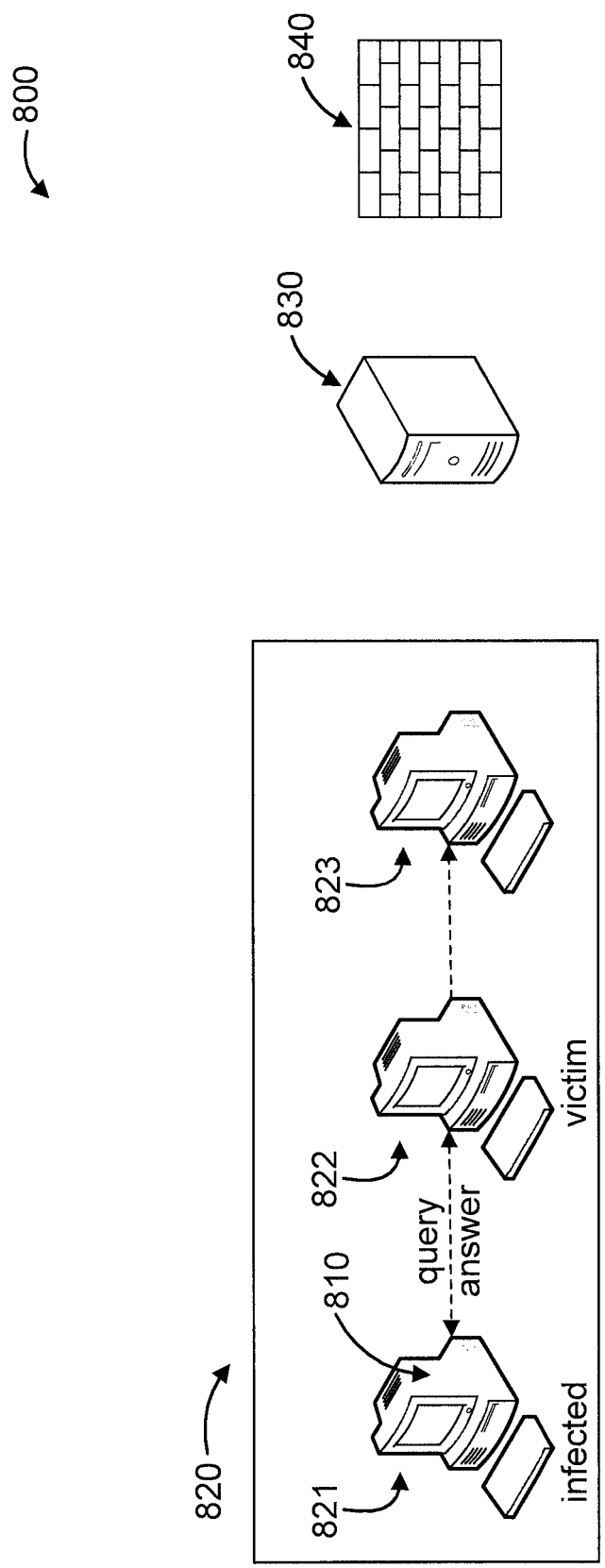
FIG. 8 shows yet another exemplary DNS attack, in accordance with an embodiment of the present invention.

FIG. 8 shows yet another exemplary DNS attack 800, in accordance with an embodiment of the present invention.

The DNS attack 800 involves a DNS name collision process 810 relating to an infected computer 821, a victim computer 822, and another computer 823 (from among a set of computers 820). The DNS attack 800 is not evident to the local DNS server 830 or a corresponding firewall 840.

Prior to querying DNS servers, some program first broadcasts multicast DNS (mDNS) requests to its local network to seek for answers from its peers. The request reaches the DNS service only when the program fails to get answers from its local peers. When it has the infected peer in its subnet, the malware from the peer can fool such requests by providing false answers and DNS service (as embodied by the local DNS server 830) cannot see such behaviors. The DNS Resolver Agent, however, can observe such activities from both infected hosts (e.g., infected computer 821) and victim hosts (e.g., victim computer 822).

While the present invention is considered to be a complete solution as it is capable of detecting broader set of DNS attacks (than conventional approaches) and providing detailed information which is useful in identifying problem causes, the present inventions can be enhanced by integrating the present invention with other security solutions. As a simple example, the present invention can refer to a DNS blacklist database to improve detection accuracy, or refer to DNS server logs to gain access to additional features.

Hereinafter, for the sake of illustration, an advanced use case is described with respect to FIG. 9, where the present invention interacts (is integrated) with an Automated Security Intelligence (ASI) system by NEC, in accordance with an embodiment of the present invention. Of course, it is to be appreciated that the present invention can be applied to other security systems for detecting DNS attacks, while maintaining the spirit of the present invention.

Figure 9:
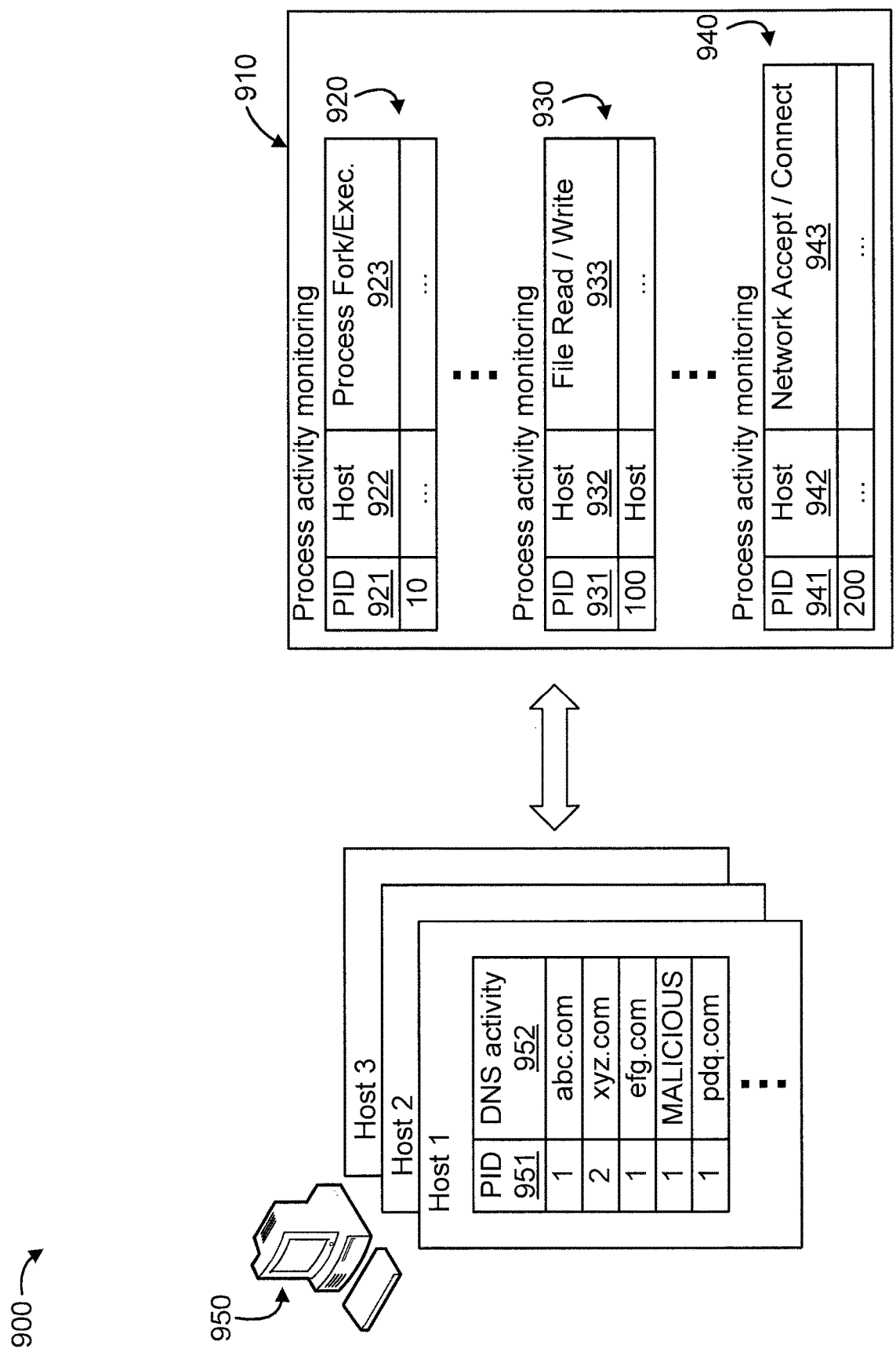
FIG. 9 shows an exemplary integration of the present invention with another security system, in accordance with an embodiment of the present invention.

FIG. 9 shows an exemplary integration 900 of the present invention with another security system, in accordance with an embodiment of the present invention.

The other security system is the ASI system 910. The ASI system 910 involves process activity monitoring 920, file activity monitoring 930, and network activity monitoring 940.

The process activity monitoring 920 involves a PID 921, a Host 922, and Process Fork/Exec element 923.

The file activity monitoring 930 involves a PID 931, a Host 932, and a File Read/Write element 933.

The network activity monitoring 940 involves a PID 941, a Host 942, and a network accept/connect element 943.

The present invention is embodied in FIG. 9 as a DNS detection and analysis system 950. The DNS detection and analysis system 950 specifies, for each host (where in the example of FIG. 9, host 1, host 2, and host 3 are shown), the following: PID 951; and DNS activity 952.

ASI 910 is an enterprise security solution that also deploys agents to end-hosts and collects extended set of system events to perform advanced security analysis. The system events include the following categories and all are labeled with Hostname and PID information: (1) process operation family that includes process creation and end activities; (2) file operation family that includes read and write activities; and (3) network operation family that includes activities for connect to and accept from other hosts.

Given that the present invention also provides program identifier (PID) and host information DNS activities can be joined with system activities captured by ASI and the integration can benefit both. Using thorough data sets of ASI, the present invention can restore better context for its analysis. Taking advantage of our invention's DNS-IP address, ASI's network activity analysis can translate IP addresses into corresponding DNS names, subsequently improving user readability as well as accuracy and effectiveness.

Figure 10:
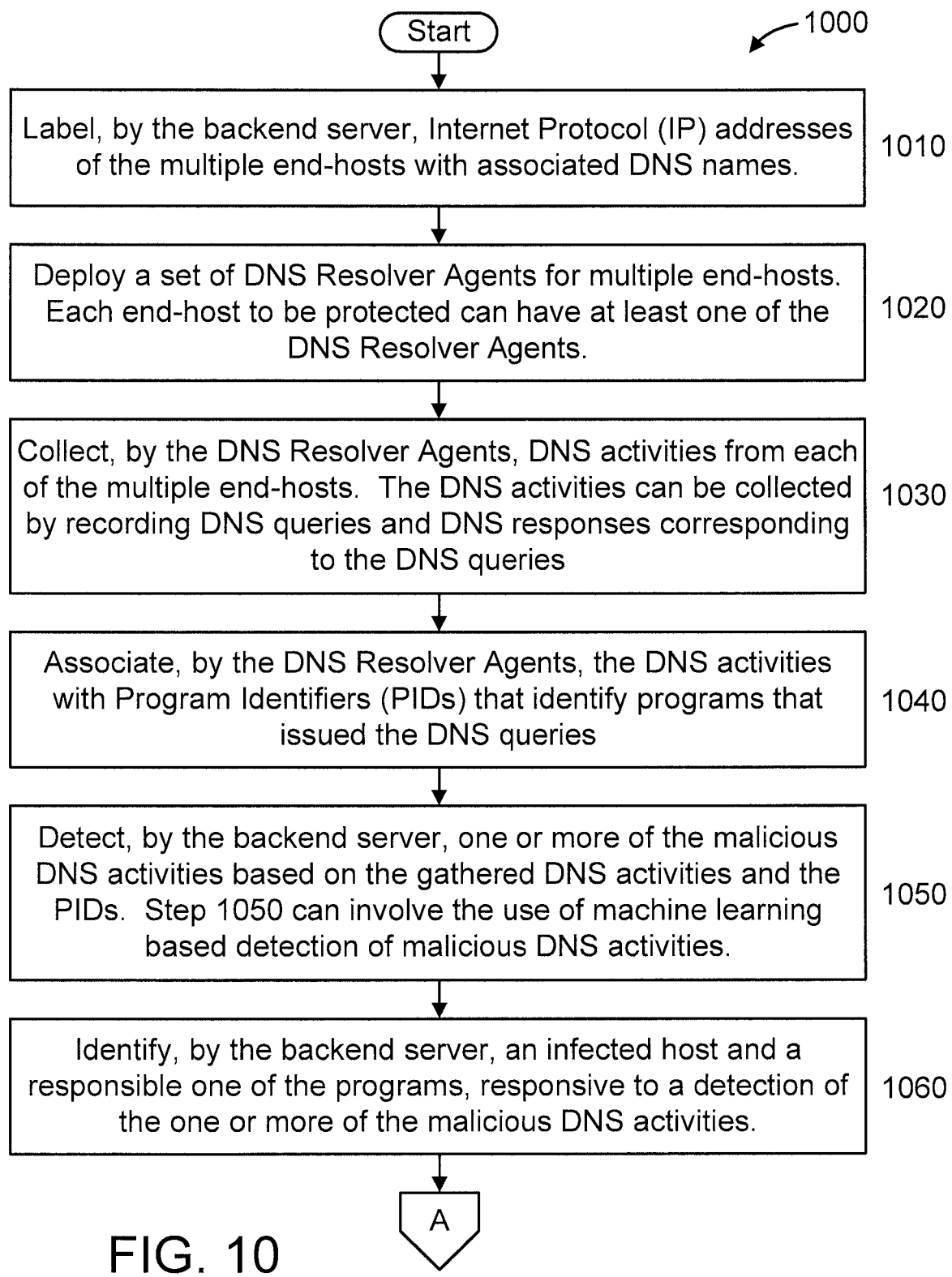
FIGS. 10-11 show an exemplary method for host level detecting for malicious Domain Name System (DNS) activities, in accordance with an embodiment of the present invention.
Figure 11:
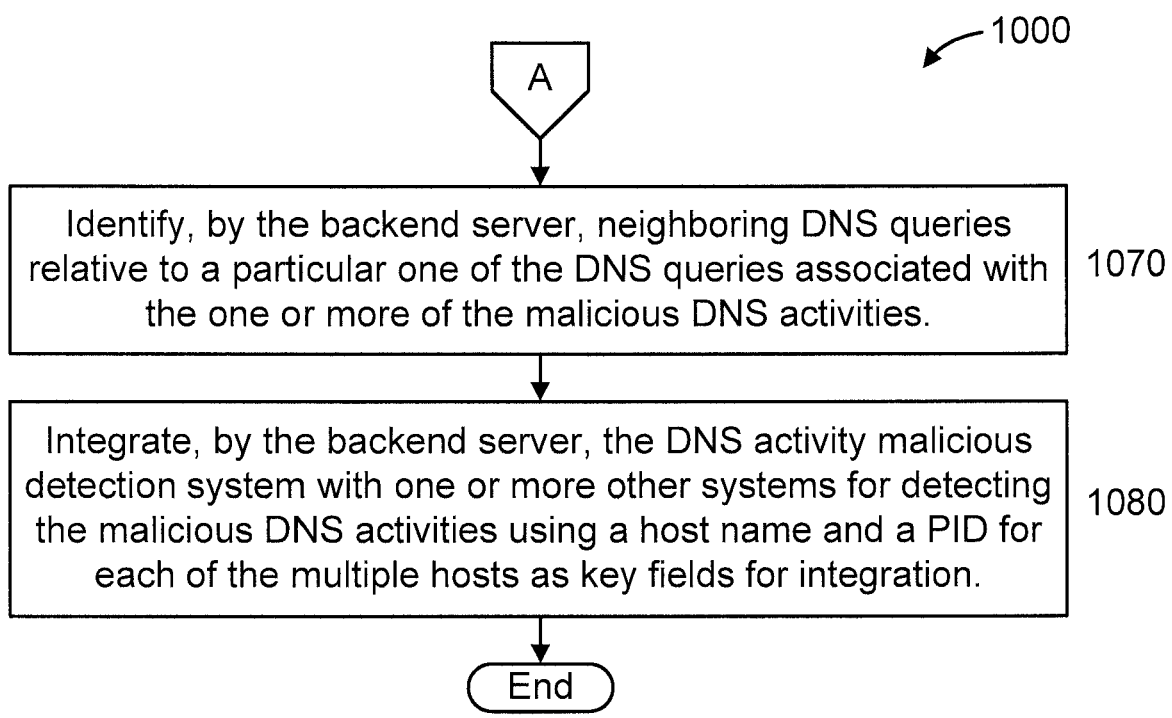

FIGS. 10-11 show an exemplary method 1000 for host level detecting for malicious Domain Name System (DNS) activities by a DNS activity malicious detection system, in accordance with an embodiment of the present invention.

At step 1010, label, by the backend server, Internet Protocol (IP) addresses of the multiple end-hosts with associated DNS names.

At step 1020, deploy a set of DNS Resolver Agents for multiple end-hosts. Each end-host to be protected can have at least one of the DNS Resolver Agents.

At step 1030, collect, by the DNS Resolver Agents, DNS activities from each of the multiple end-hosts. In an embodiment, the DNS activities can be collected by recording DNS queries and DNS responses corresponding to the DNS queries.

At step 1040, associate, by the DNS Resolver Agents, the DNS activities with Program Identifiers (PIDs) that identify programs that issued the DNS queries (see, e.g., FIG. 3 for a Linux system, FIG. 4 for a Windows system, and FIG. 5 for a Mac OSX system).

At step 1050, detect, by the backend server, one or more of the malicious DNS activities based on the gathered DNS activities and the PIDs. In an embodiment, step 1050 involves the use of machine learning based detection of malicious DNS activities.

At step 1060, identify, by the backend server, an infected host and a responsible one of the programs, responsive to a detection of the one or more of the malicious DNS activities.

At step 1070, identify, by the backend server, neighboring DNS queries relative to a particular one of the DNS queries associated with the one or more of the malicious DNS activities.

At step 1080, integrate, by the backend server, the DNS activity malicious detection system with one or more other systems for detecting the malicious DNS activities using a host name and a PID for each of the multiple hosts as key fields for integration.

A description will now be given regarding some of the many attendant competitive and commercial values/advantages provided by the present invention.

From the high-level, in contrast to the existing solution, the present invention employs a bottom-up approach that: captures all DNS activities reported to DNS servers as well as local activities not visible outside the local network; and associates DNS activity records with their responsible program identifiers.

This design choice provides a number of key advantages over previous solutions, some of which are as follows.

1. The data reported to the backend server is a super-set of logs collected from upper-layer DNS servers, providing more features that facilitate the detection of broader sets of attack activities with higher accuracy.

2. For instance, upon a detection of suspicious queries or answers, the present invention can immediately locate the host and the responsible program (e.g., Chrome web browser). Furthermore, the analysis can search for neighboring DNS queries issued before or after. This helps restore temporal and spatial context by tracking the network connections that lead to or result in malicious behaviors.

3. Using program identifier as key field in joining different data sets, DNS information can be integrated with other system activities.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for host level detection of malicious Domain Name System (DNS) activities in a network environment having multiple end-hosts, the method comprising:
   gathering, by a set of DNS resolver agents, DNS activities from each of the multiple end-hosts by recording DNS queries and DNS responses corresponding to the DNS queries;
   associating, by the set of DNS resolver agents, the DNS activities with Program Identifiers (PIDs) that identify programs that issued the DNS queries; and
   detecting, by a backend server, one or more of the malicious DNS activities based on the gathered DNS activities and the PIDs;
   wherein the associating, by the set of DNS resolver agents, the DNS activities with the PIDs comprises at least one of:
   (i) labeling, by a kernel in at least one of the DNS resolver agents, the DNS activities, including system wide network DNS activities, with associated ones of the PIDs using a process table data structure; (ii) accessing, by at least one of the DNS resolver agents, a DNS service that records the DNS activities and associated ones of the PIDs using an Event Tracing for Windows (ETW) channel; and (iii) at least one of the DNS resolver agents gathers the DNS activities using a first channel corresponding to a program that makes indirect DNS calls and a second channel corresponding to one or more programs that makes direct DNS calls from among the programs that issues the DNS queries.

2. The computer-implemented method of claim 1, further comprising embedding, by an operating system kernel comprised in at least one of the DNS resolver agents, the PIDs into a communication packet buffer and capturing packets that include the DNS queries and the DNS responses.

3. The computer-implemented method of claim 1, wherein the backend server is configured to perform machine learning based detection of the malicious DNS activities.

4. The computer-implemented method of claim 1, further comprising identifying, by the backend server, an infected host and a responsible one of the programs, responsive to a detection of the one or more of the malicious DNS activities.

5. The computer-implemented method of claim 4, further comprising identifying, by the backend server, neighboring DNS queries relative to a particular one of the DNS queries associated with the one or more of the malicious DNS activities.

6. The computer-implemented method of claim 1, further comprising labelling, by the backend server, Internet Protocol (IP) addresses of the multiple end-hosts with associated DNS names.

7. A system for host level detection of malicious Domain Name System (DNS) activities in a network environment having multiple end-hosts, the system comprising:
   a set of DNS resolver agents configured to (i) gather DNS activities from each of the multiple end-hosts by recording DNS queries and DNS responses corresponding to the DNS queries, and (ii) associate the DNS activities with Program Identifiers (PIDs) that identify programs that issued the DNS queries; and
   a backend server configured to detect one or more of the malicious DNS activities based on the gathered DNS activities and the PIDs;
   wherein the associating the DNS activities with the PIDs comprises at least one of:
   (i) at least one of the DNS resolver agents comprises a kernel configured to label the DNS activities, including system wide network DNS activities, with associated ones of the PIDs using a process table data structure; (ii) at least one of the DNS resolver agents is configured to access a DNS service that records the DNS activities and associated ones of the PIDs using an Event Tracing for Windows (ETW) channel; and (iii) at least one of the DNS resolver agents is configured to gather the DNS activities using a first channel corresponding to a program that makes indirect DNS calls and a second channel corresponding to one or more programs that makes direct DNS calls from among the programs that issues the DNS queries.

8. The system of claim 7, wherein at least one of the DNS resolver agents comprises an operating system kernel configured to embed the PIDs into a communication packet buffer and capture packets that include the DNS queries and the DNS responses.

9. The system of claim 7, wherein the backend server is configured to perform machine learning based detection of the malicious DNS activities.

10. The system of claim 7, wherein the backend server is further configured to identify an infected host and a responsible one of the programs, responsive to a detection of the one or more of the malicious DNS activities.

11. The system of claim 10, wherein the backend server is further configured to identify neighboring DNS queries relative to a particular one of the DNS queries associated with the one or more of the malicious DNS activities.

12. The system of claim 7, wherein the backend server is further configured to integrate the system with one or more other systems for detecting the malicious DNS activities using a host name and a PID for each of the multiple hosts as key fields for integration.

13. The system of claim 7, wherein the backend server is further configured to label Internet Protocol (IP) addresses of the multiple end-hosts with associated DNS names.

14. A computer program product for host level detection of malicious Domain Name System (DNS) activities in a network environment having multiple end-hosts, the computer program product comprising a non-transitory computer readable storage medium having program instructions embodied therewith, the program instructions executable by a computer to cause the computer to perform a method comprising:

gathering, by a set of DNS resolver agents, DNS activities from each of the multiple end-hosts by recording DNS queries and DNS responses corresponding to the DNS queries;

associating, by the set of DNS resolver agents, the DNS activities with Program Identifiers (PIDs) that identify programs that issued the DNS queries; and detecting, by a backend server, one or more of the malicious DNS activities based on the gathered DNS activities and the PIDs;

wherein the associating, by the set of DNS resolver agents, the DNS activities with the PIDs comprises at least one of:

(i) labeling, by a kernel in at least one of the DNS resolver agents, the DNS activities, including system wide network DNS activities, with associated ones of the PIDs using a process table data structure; (ii) accessing, by at least one of the DNS resolver agents, a DNS service that records the DNS activities and associated ones of the PIDs using an Event Tracing for Windows (ETW) channel; and (iii) at least one of the DNS resolver agents gathers the DNS activities using a first channel corresponding to a program that makes indirect DNS calls and a second channel corresponding to one or more programs that makes direct DNS calls from among the programs that issues the DNS queries.

\* \* \* \* \*